Aug. 16, 1960  C. F. GERBER  2,949,090
WEATHER-VANE STREAMLINE FAIRING
Filed Feb. 18, 1955
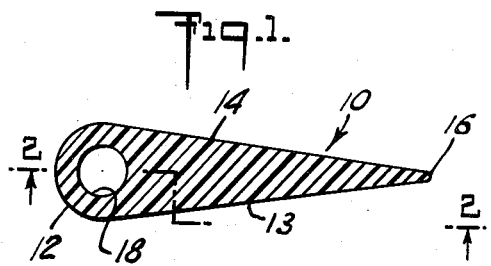
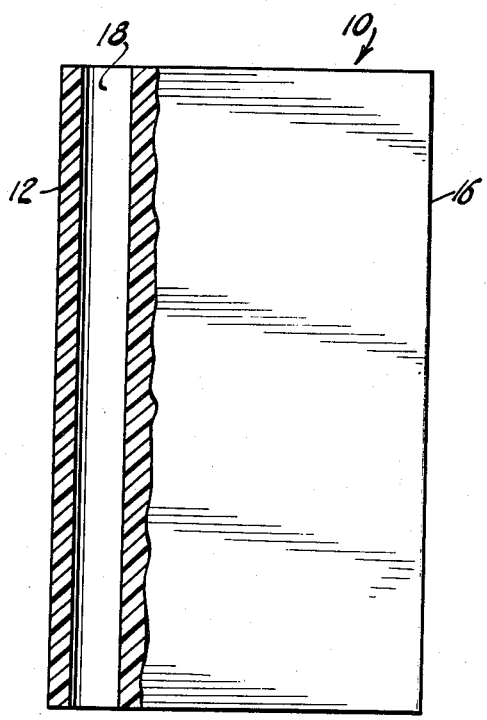
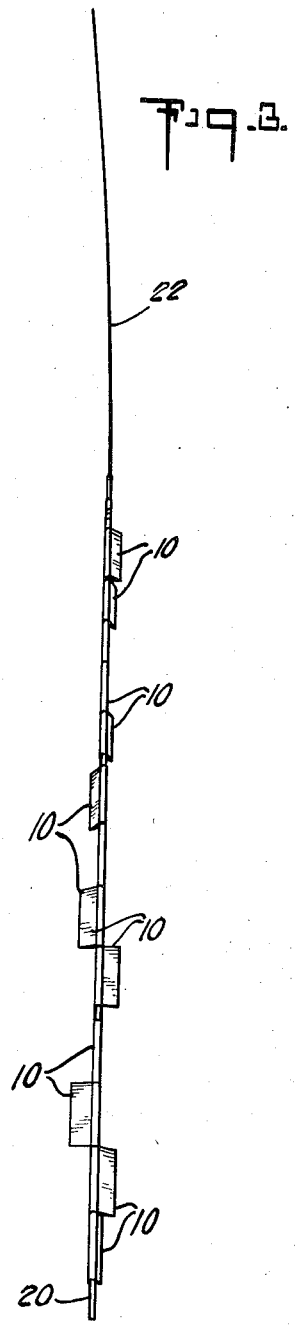
INVENTOR
CHARLES F. GERBER
BY George Sipkin
Lee Q. Huntsberger
ATTORNEY United States Patent Office 2,949,090
Patented Aug. 16, 1960

2,949,090

WEATHER-VANE STREAMLINE FAIRING

Charles F. Gerber, Poquonnock Bridge, Conn., assignor to the United States of America as represented by the Secretary of the Navy Filed Feb. 18, 1955, Ser. No. 489,313

4 Claims. (Cl. 114—90)

(Granted under Title 35, U.S. Code (1952), sec. 266)

The invention described herein may be manufactured and used by or for the Government of the United States of America for governmental purposes without the payment of any royalties thereon or therefor.

This invention relates to a weather-vane streamline fairing and, more particularly, to a weather-vane streamline fairing suitable for use with a shaft or rod exposed to the flow of a fluid which does not always flow in the same direction.

The term weather-vane as used herein refers to a fairing which aligns itself with the direction of flow of a fluid in which it is immersed.

Weather-vane streamline fairings, of the type described herein, were found to be advantageous when used on the mast supporting a whip antenna located on a high-speed submarine. When a fixed fairing was employed, side forces encountered during turns of the submarine were great enough to cause failure of the mast.

Briefly, this invention contemplates a plurality of streamline fairings mounted in stacked relationship on a cylindrical mast, each of the fairings being free to rotate about the axis of the cylindrical mast independently of the other fairings. Each of the fairings has a right-circular-cylindrical front portion concentric with the pivot axis of the cylindrical mast, so that hydrodynamic or other fluid forces are not effective in rotating the fairing out of the alignment with the flow of the fluid past the fairing.

It is therefore an object of this invention to provide a plurality of similar, independently mounted, free-rotating streamlined fairings, which align themselves with the flow of a fluid to which they are exposed, in stacked relationship on a mast adapted to support an antenna, such as a whip antenna, located on a high-speed submarine, in order to minimize side forces encountered during turns of the submarine, to thereby prevent failure of the mast.

Other objects and many of the attendant advantages of this invention will be readily appreciated as the same becomes better understood by reference to the following detailed description when considered in connection with the accompanying drawings wherein:

Fig. 1 is a transverse section of a streamline fairing constructed in accordance with the principles embodied in this invention;

Fig. 2 is a longitudinal section of the fairing shown in Fig. 1 taken along line 2—2, and Fig. 3 shows an assembly of a mast and a plurality of fairings.

Referring now to Figs. 1 and 2, fairing 10 may be made of any material such as metal, alloy, plastic, fiber, wood or combinations thereof, so long as the material is sufficiently strong. However, the fairings actually constructed were made from plastic-impregnated fiber glass, and are shown as such in Figs. 1 and 2.

Fairing 10 consists of a right-circular-cylindrical front portion 12, planar side portions 13 and 14 and rear portion 16. Rear portion 16 is parallel to the axis of front portion 12. Side portions 13 and 14, which are tangent to front portion 12 and are parallel to the axis thereof, extend from front portion 12 to rear portion 16. Rear portion 16 has the minimum width necessary to provide sufficient structural strength for fairing 10. Hole 18, which provides a bearing for the mast, is coaxial with front portion 12.

If desired, fairing 10 can be made in the form of a hollow shell, rather than solid, as shown. In this case, the bearing for the mast would comprise holes coaxial with the axis of front portion 12 in the top and bottom ends, respectively, of fairing 10.

Referring now to Fig. 3, there is shown cylindrical mast 20 which supports whip antenna 22. Mounted in stacked relationship on mast 20 are a plurality of fairings 10, each of which is similar to the fairing shown in Figs. 1 and 2. Each of fairings 10 is free to pivot independently about the axis of cylindrical 20.

In any streamline shape, drag and lift are caused by differences in the pressures on the surfaces of the shape. These differential pressure act normal to the surface exposed to them. By using a right-circular-cylindrical front portion 12, which is concentric with the pivot axis of mast 20, all forces on that part of the weather-vane streamline fairing ahead of the pivot axis act through the pivot center, and thus have no tendency to turn the fairing. Thus, the position of the fairing with relation to the fluid flowing past it is controlled only by planar side surfaces 13 and 14. In this way, the fairing is constantly and stably aligned with the water flow.

It has been determined by tests that to achieve dynamic stability when this invention is employed on a submarine antenna, the ratio of the length of the fairing, the distance from its leading edge to its lagging edge, to its maximum width, the diameter of the front portion, should be between 3.5 to 1 and 6.0 to 1. The exact value depends upon the speed of the submarine and the individual conditions which prevail.

It will be seen that the use of a plurality of fairings permits each fairing to separately align itself with the fluid flowing past it, even when the direction of flow varies along the length of mast 20.

Obviously many modifications and variations of the present invention are possible in the light of the above teachings. It is therefore to be understood that within the scope of the appended claims the invention may be practiced otherwise than as specifically described.

I claim:

1. An antenna supporting mast for a submarine which offers a minimum of resistance to air and water as the submarine turns and operates in submerged, partly submerged, and surfaced conditions which comprises an upright, rigid cylindrical post mounting a whip antenna rod on the top thereof to form an upward extension thereof, and a plurality of similar, weather-vane, streamlined fairings individually and freely rotatable on said post in a stacked relationship on the post, each fairing having as its leading edge a partly cylindrical surface which has its axis of curvature coincident with the longitudinal axis of said post, the sides of each fairing being approximate planes tangent to the opposite sides of said cylindrical forward surface and tapering to a minimum thickness at the trailing edge, whereby each fairing may individually swivel on said post independently of the positions of the other fairings and freely assume positions in which it offers minimum resistance to the air or water in which it may be disposed at any time as the submarine turns, dives, surfaces, or runs partly submerged.

2. The mast as set forth in claim 1, wherein the ratio of the length of the fairing between its leading and trailing edges to the diameter of the cylindrical front surface is between 3.5 to 1 and 6.0 to 1.

3. An antenna supporting mast for a submarine, which comprises an upright, rigid, cylindrical post, and a plurality of weather-vane fairings arranged in a stacked, end to end relation on said post and each having a bearing mounted on said post for individual, independent and free rotation thereon, each fairing having as its leading edge approximately one-half of a right circular, cylindrical surface having a center line of curvature that is substantially coincident with the longitudinal axis of said post, the sides of each fairing being approximately plane surfaces tangent to the opposite sides of said cylindrical surface of the said leading edge and tapering to a minimum thickness at the trailing edge, whereby each fairing may individually and independently swivel on said post independently of the angular position on said post of the other fairings and freely assume a position in which it offers a minimum resistance to the air or water in which it may be disposed, and fluid pressure on the leading edge of each fairing will be radial to the surface of such leading edge and exert no turning moment on that fairing in all of its possible angular positions in swiveling about said post.

4. A weather-vane fairing construction for use where different parts along its length may be subjected to different direction streams comprising a cylindrical, rigid post, a plurality of fairings arranged in an end to end relation on and along said post and each having a bearing mounted on said post for individual, independent and free rotation thereon, each fairing having as its leading edge approximately one-half of a right, circular, cylindrical surface having a center line of curvature that is substantially coincident with axes of its bearing and said post, the sides of each fairing being approximately plane surfaces tangent to the sides of the cylindrical surface of said leading edge and tapering to a minimum thickness at the trailing edge, whereby each fairing may rotate freely on said post independently of the angular positions on said post of the other fairings, and always assume a position in which it offers a minimum of resistance to the fluid medium in which that fairing may be at any time, and fluid pressure on the leading edge of each fairing will be radial to the cylindrical surface of such leading edge and exert no turning force on that fairing in all of its possible angular positions in swiveling about said post.

References Cited in the file of this patent

UNITED STATES PATENTS

| | | |
|---|---|---|
| D. 157,090 | Schmidt | Jan. 31, 1950 |
| 1,408,868 | Dutcher | Mar. 7, 1922 |
| 1,433,729 | Kemp | Oct. 31, 1922 |
| 2,397,957 | Freeman | Apr. 9, 1946 |
| 2,495,748 | Matson | Jan. 31, 1950 |
| 2,790,171 | Waldorf et al. | Apr. 23, 1957 |

FOREIGN PATENTS

| | | |
|---|---|---|
| 126,437 | Great Britain | May 5, 1919 |
| 255,507 | Great Britain | July 26, 1926 |
| 579,159 | Great Britain | July 25, 1946 |